United States Patent [19]

Kadlec et al.

[11] Patent Number: 5,247,642
[45] Date of Patent: Sep. 21, 1993

[54] APPARATUS FOR DETERMINING CACHEABILITY OF A MEMORY ADDRESS TO PROVIDE ZERO WAIT STATE OPERATION IN A COMPUTER SYSTEM

[75] Inventors: Kenneth A. Kadlec, Irvine; Shmuel Shottan, Mission Viejo, both of Calif.

[73] Assignee: AST Research, Inc., Irvine, Calif.

[21] Appl. No.: 622,729

[22] Filed: Dec. 5, 1990

[51] Int. Cl.[5] .................. G06F 12/08; G06F 13/14
[52] U.S. Cl. ........................... 395/425; 364/DIG. 1; 364/243.4
[58] Field of Search ... 364/200 MS File, 900 MS File; 395/425, 400

[56] References Cited

U.S. PATENT DOCUMENTS

| | | | |
|---|---|---|---|
| 4,669,043 | 5/1987 | Kaplinsky | 395/400 |
| 4,819,154 | 4/1989 | Stiffler et al. | 395/575 |
| 5,045,998 | 9/1991 | Begun et al. | 395/325 |
| 5,091,846 | 2/1992 | Sachs et al. | 395/250 |
| 5,091,850 | 2/1992 | Culley | 395/400 |
| 5,097,532 | 3/1992 | Borup et al. | 395/425 |
| 5,109,334 | 4/1992 | Kamuro | 395/400 |
| 5,155,834 | 10/1992 | Ryan et al. | 395/425 |

OTHER PUBLICATIONS

M. Morris Mano, Computer System Architecture, 2nd edition, pp. 403–473.
Cliff Rhodes, "Caches keep main memories from slowing down fast CPUs," Electronic Design, Jan. 21, 1982, pp. 179–184.
Cliff Rhodes, et al., "Cache-memory functions surface on VLSI chip," Electronic Design, Feb. 18, 1982, pp. 159–163.
Jerry VanAken, "Match cache architecture to the computer system," Electronic Design, Mar. 4, 1982, pp. 93–95, 97, 98.
Efrem G. Mallach, "What does cache buy for you?", Mini-Micro Systems, May 1982, pp. 267, 268, 271.
Robert Hartwig, et al., "Large disk cache uses fast 64k-by-1 static RAMs to speed data-base accesses," Electronic Design, Sep. 19, 1985, pp. 193–198, 200, 202.
Howard Sachs, "Improved Cache Scheme Boosts System Performance," Computer Design, Nov. 1, 1985, pp. 83–86.
Alan Jay Smith, "Cache memory design: an evolving art," IEEE Spectrum, Dec. 1987, pp. 40–44.
David Shear, "Cache-memory systems benefit from on-chip solutions," EDN, Dec. 10, 1987, 245–249, 252, 253, 258, 260.

(List continued on next page.)

Primary Examiner—Joseph L. Dixon
Assistant Examiner—Matthew Kim
Attorney, Agent, or Firm—Knobbe, Martens, Olson & Bear

[57] ABSTRACT

A computer system includes an Intel 80486 microprocessor having an internal cache memory and a local memory tightly coupled to the microprocessor that can respond to memory accesses without requiring the microprocessor to execute a wait state. An external cache memory system is provided to provide additional cache storage to provide copy back capabilities so that data written to the external cache does not have to be automatically written to slower bulk memory. The computer system includes a conventional Industry Standard Architecture bus (ISA-bus) which may include memory on the bus. The computer system may also include an external math coprocessor. In order to preclude storing data from the math coprocessor and from the ISA-bus memory, the external cache memory system includes a cache determination circuit that selectively generates a cache enable signal to the microprocessor and to the external cache memory system so that only cacheable data is stored in the two caches. The cache determination circuit operates sufficiently fast that when the microprocessor addresses a zero-wait state device, such as the external math coprocessor or the local memory, a cache enable signal is generated within the first clock cycle so that the local memory can respond within the second clock cycle without requiring a microprocessor wait state and the cache enable signal is not generated if the math coprocessor is addressed.

3 Claims, 8 Drawing Sheets

OTHER PUBLICATIONS

William Ringer, "How to Manage Your Cache Options," *ESD: The Electronic System Design Magazine*, Jun. 1988, pp. 71, 72, 74, 75.

Jim Langston, "Boost DRAM performance with SRAM caching scheme," *Electronic Design*, Jun. 9, 1988, pp. 107-112.

Richard Crisp, et al., "Designing A Cache for a Fast Processor," *Electronic Design*, Oct. 13, 1988, pp. 111-116, 118.

Mark D. Hill, "A Case for Direct-Mapped Caches," *Computer*, Dec. 1988, pp. 25-40.

Mammad Safai, "Cache Design Paces 33-MHz 80386 CPUs," *Microprocessor Design Guide*, 1989, pp. 39, 42, 44, 46, 48.

Joseph C. Circello, et al., "Refined method brings precision to performance analysis," *Computer Design*, Mar. 1, 1989, pp. 77-80, 82.

Jim Peterson, "System-Level Concerns Set Performance Gains," *High Performance Systems*, Sep. 1989, pp. 71-73, 76, 77.

Raymond M. Leong, "Cache memories and MMUs work together in high-speed systems," *EDN*, Mar. 15, 1990, pp. 169-172, 174.

APPARATUS FOR DETERMINING CACHEABILITY OF A MEMORY ADDRESS TO PROVIDE ZERO WAIT STATE OPERATION IN A COMPUTER SYSTEM

BACKGROUND OF THE INVENTION

1. Field of the Invention

The present invention is in the field of microprocessor based computer systems, and, more particularly, is in the field of cache memory management systems for Industry Standard Architecture (ISA) compatible computer systems and other computer systems based upon the Intel ® 80486 (i486 TM ) microprocessor.

2. Description of the Related Art

Industry Standard Architecture (ISA) compatible computer systems are microprocessor based computer systems based upon the Intel ® 80×86 microprocessors (i.e., the 80286, 80386, 80386SX and 80486 microprocessors). Such ISA compatible computer systems are very well-known, and a very competitive industry has evolved to supply computer systems, peripheral components, add-in boards, software, and the like, that are based on the industry standard architecture. Other bus systems have also developed for computer systems based on the 80×86 family of computers. For example, the Extended Industry Standard Architecture (EISA) provides a 32-bit version of the original ISA-bus, and the Microchannel system used by IBM and others provides an alternative to the ISA-bus and the EISA-bus. Although described herein with respect to the ISA compatible computer systems, it should be understood that the disclosed invention can be used with EISA compatible computer systems and microchannel computer systems, and the like.

The original industry standard architecture was based upon the IBM ® AT computer which included a so-called AT-bus, or ISA-bus, which was used to communicate between the microprocessor and a number of peripheral devices that were connected to the bus. In many systems, additional memory was included on the ISA-bus to increase the data storage capacity of the microprocessor. Because of the desire to be compatible with previously developed add-in boards, and the like, the operational speed of the ISA-bus has typically been limited to 8 or 10 MHz. More recently, many ISA compatible computer systems have included additional memory (i.e., "local memory") on a local processor bus. The local processor bus does not have the speed limitations of the ISA-bus so that the memory access times are not limited by the ISA-bus speed. However, many of the computer systems continue to include memory on the ISA-bus in addition to the local memory. In particular, memory on the ISA-bus is desirable when external devices need to have access to the memory. For example, a local area network (LAN) controller may include its own memory on the ISA-bus. Such memory is typically a dual-ported memory such that the LAN controller access the memory via one port and the microprocessor can access a second port of the memory via the ISA-bus.

As in practically all computer systems, there is a continuing goal of increasing memory capacity and memory speed in ISA compatible computer systems so as to increase the performance of the systems and allow the systems to be used with increasingly more powerful microprocessors. Increased speed and increased capacity are generally inconsistent goals since larger capacity memories tend to be slower than smaller capacity memories. Even when an ISA compatible computer system includes local memory on a local processor bus, the memory access times are generally in the 80-100 nanosecond range. Thus, many ISA compatible computer systems provide a compromise between speed and capacity by including so-called "cache memories" that have a relatively small amount of very fast memory interposed between the microprocessor and the slower main memory. Accesses to the main memory preferably are transferred through the cache memory so that the microprocessor obtains instructions and data from the cache memory. The advantage of the cache memory lies in the fact that statistically most computer programs tend to access the same group of memory locations on a repetitive basis so that once the instructions and/or data are in the cache memory, the microprocessor obtains the data from the relatively fast cache memory rather than the relatively slow main memory. (As used hereinafter, "data" will refer to both instructions and data.)

The cache memory is controlled by a cache control circuit. When the microprocessor attempts to access a memory location that is not in the cache memory, the cache control circuit swaps in a new line of data (i.e., a multiple-byte block, such as 16 or 32 bytes, for example) from main memory and swaps out an old line of data. Whether the old line of data needs to be transferred back to the main memory or simply discarded depends upon whether the cache control circuit operates the cache memory as a "write-through" cache memory or a "copy-back" cache memory. In a write-through cache memory system, data transferred from the microprocessor to the cache memory is also written to the corresponding location in the main memory so that the main memory is coherent with the cache memory. In a copy-back cache memory system, the data is initially stored only in the cache memory; however, when it is necessary to swap new data from the main memory into a cache location, the "dirty" line of data in the cache location is written to main memory. In many applications, particularly where the microprocessor is transferring a substantial amount of data to the memory and back, the copy-back cache memory system is advantageous because the stored data does not have to be transferred to the main memory until a line of data is swapped.

Recently, the Intel 80486 (i486) microprocessor has become available. The 80486 microprocessor is generally compatible with the Intel 80386 microprocessor except that the 80486 further includes, among other improvements, an internal math coprocessor and an internal 8,192-byte cache memory. The internal cache memory of the 80486 is of the write-through type that operates with 16-byte lines.

Because of the limited size of the internal cache memory, it has been found to be desirable to include an additional cache memory system external to the 80486 microprocessor that includes increased storage capacity (e.g., 128 KBytes). In addition, as discussed above, it is often desirable to have a copy-back cache.

The operating frequency of the 80486 microprocessor imposes severe constraints on an external cache memory system. An 80486 microprocessor operating at 33 MHz, for example, has a clock cycle of 30 nanoseconds. When the 80486 microprocessor places a new address on its memory address lines, it activates an address status signal (ADS#, where a "#" symbol after a signal name indicates that the signal is active low) to indicate that the addresses are valid and that a valid bus cycle has started. If a device responds with an active non-burst ready (RDY#) signal or an active burst ready signal (BRDY#) signal, within approximately 35-40 nanoseconds after ADS# is activated, the 80486 microprocessor will continue processing without delay. If neither the RDY# nor the BRDY# signal is received within 35-40 nanoseconds, the microprocessor will automatically insert 30-nanosecond wait states until one of the signals is received. In order to achieve the maximum data processing rate of the 80486 microprocessor, it is desirable to operate the 80486 without inserting any wait states when accessing an external cache memory system or any other high speed external device, such as an external coprocessor (e.g., a Weitek 4167 coprocessor).

When the 80486 generates an external address, a device addressed by the 80486 has than 10 nanoseconds (e.g., 9 nanoseconds) to determine whether the address corresponds to a cacheable address range and to return an active cache enable (KEN#) signal to the 80486. Otherwise, the data from the external device will not be cached by the microprocessor. Since it is important to the efficient operation of the microprocessor that it cache all cacheable addresses and to operate without wait states where possible, an external device should be able to respond to a memory address and generate the KEN# signal and the RDY# or BRDY# signal within the time requirements. Typically, nine nanoseconds is not a sufficient amount of time to make such a determination.

SUMMARY OF THE INVENTION

The present invention is an external cache memory system for an 80486 microprocessor. The cache memory system includes memory that has a sufficiently short access time such that when the microprocessor reads a memory location cached within the external cache memory, the external cache memory provides data to the microprocessor and responds with an active BRDY# signal or an active RDY# signal without requiring the insertion of any wait states by the 80486 microprocessor. The external cache memory system also generates an active cache enable (KEN#) signal within the required time so that memory accesses to the external cache memory are cached within the internal cache memory of the microprocessor.

The cache memory system of the present invention also monitors the addresses provided by the microprocessor and determines whether the address is directed to an external device that cannot be cached (e.g., an external math coprocessor) and, if the address is not cacheable, blocks the generation of the cache enable signal.

DETAILED DESCRIPTION OF THE PREFERRED EMBODIMENT

Figure 1:
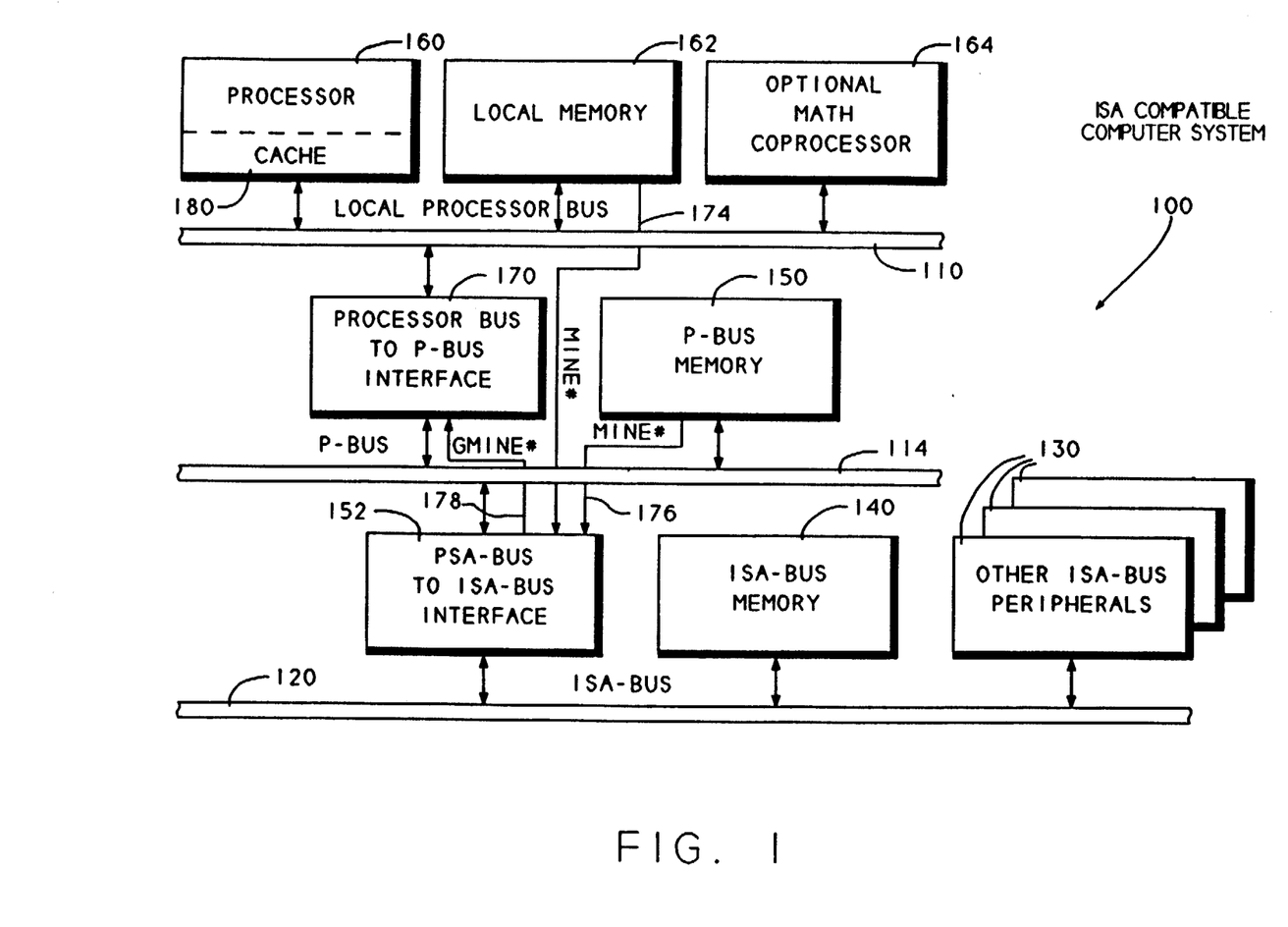
FIG. 1 is a simplified block diagram of an exemplary computer system utilizing an microprocessor in combination with an ISA bus.

FIG. 1 is a simplified block diagram of an ISA compatible computer system 100 into which the present invention may be incorporated. The computer system 100 includes a local processor bus 110, a P-bus 114 and an ISA-bus 120. The ISA-bus 120 is preferably a conventional ISA-bus which can transfer 8 bits or 16 bits of data per transfer operation, or the bus 120 may be an extended industry standard architecture (EISA) bus which includes capabilities for transferring up to 32 bits of data per transfer operation. The operational characteristics of the ISA-bus and the EISA-bus are very well known, and is described, for example, in Edward Solari, "AT BUS DESIGN," Annabooks, 1990, ISBN 0-929392-08-6. The present invention may also be used in connection with a microprocessor system based upon the IBM ® microchannel architecture, or an equivalent. The invention will be described below in connection with the ISA-bus system.

The ISA-bus 120 is connected to a plurality of conventional ISA-bus peripheral devices 130, which may include, for example, a hard disk controller, a floppy disk controller, a LAN interface, or the like. The ISA-bus 120 is also connected to a conventional ISA-bus memory 140.

The P-bus 114 is a high speed bus that provides asynchronous communication to a plurality of devices connected to the P-bus 114. For example, a P-bus memory module 150 can be connected to the P-bus 114 to provide additional memory storage. The P-bus 114 is a 32-bit data bus and thus is not limited to 8-bit- or 16-bit transfers as on the ISA-bus 120. Typically, the P-bus 114 operates at a substantially higher data rate than the 8 MHz or 10 MHz ISA-bus 120. A P-bus to ISA-bus interface 152 provides an interconnection between the two buses so that the data rate of the P-bus 114 can be greater than the data rate of the ISA-bus 120. Preferably, the P-bus to ISA-bus interface 152 is an asynchronous interface so that the data rate of the P-bus 114 can be varied independently of the data rate of the ISA-bus 120. An asynchronous P-bus to ISA-bus interface 152 is described in commonly owned copending U.S. Pat. Application Ser. No. 433,982, filed on Nov. 9, 1989, which is incorporated herein by reference.

A processor 160 and a local memory 162 are connected directly to the local processor bus 110 and communicate with each other via the local processor bus 110. An optional external math coprocessor 164 can also be connected to the local processor bus 110 as shown. The local processor bus 110 is a synchronous data bus that is synchronized to the clock speed of the processor 160, the local memory 162 and the math coprocessor 164. Since the local processor bus 110 is a synchronous data bus, operations on the local processor bus 110 (e.g., communications between the processor 160 and the local memory 162 or the coprocessor 164) can operate without requiring any wait states (wait states are discussed below). The processor 160 communicates with the P-bus memory 150 via a processor bus to P-bus interface 170 which provides handshaking between the local processor bus 110 and the P-bus 114. The processor 160 also communicates with the ISA-bus memory 140 and the ISA-bus peripheral devices 130 via the processor bus to P-bus interface 170 and the P-bus to ISA-bus interface 152. It can be seen that the computer system 100 of FIG. 1 has three levels of processor communication: high speed synchronous communication via the local processor bus 110; high speed asynchronous communication via the P-bus 114; and lower speed asynchronous communication via the ISA-bus 120.

When the processor 160 initiates a bus operation, it provides an address on the local processor bus 110. If the address corresponds to an address allocated to the local memory 162, the local memory 162 recognizes the address and responds with an active BRDY# or RDY# signal (not shown) and transfers the data to the processor 160. The local memory 162 also generates an active MINE# signal on a signal line 174 which is communicated to the P-bus to ISA-bus interface 152. If the address corresponds to the P-bus memory 150, the P-bus memory activates a MINE# signal on a signal line 176, also connected to the P-bus to ISA-bus interface 170. The processor bus to P-bus interface 170 communicates a RDY# signal generated by the P-bus memory 150 to the processor 160 via the local processor bus 110. Another device, such as an additional memory module (not shown) on the P-bus 114 would activate a MINE# signal if the address corresponds to an address allocated to that device. If an active MINE# signal is received by the P-bus to ISA-bus interface 152 from any of the devices an active GRINE# signal is generated on a signal line 178. The GMINE# signal is communicated to the processor bus to P-bus interface 170. When an active GMINE# signal is generated, the P-bus to ISA-bus interface 152 blocks communications between the local processor bus 110 and the ISA-bus 120. If an active MINE# signal is not received by the P-bus to ISA-bus interface 152 from any of the devices, the P-bus to ISA-bus interface 152 initiates a bus cycle on the ISA-bus 120. By locating the local memory from the P-bus, communications between the processor 160 and the local memory 162 can proceed at the higher data rate of the local processor bus 110, and the data rate only needs to be slowed when the processor 160 needs to communicate with the P-bus memory 150 on the P-bus 114 or needs to communicate with the ISA-bus memory 140 or other peripheral device 130 on the ISA-bus 120.

As set forth above, the processor 160 is preferably an Intel 80486 microprocessor that includes an internal cache memory (CACHE) 180 that communicates with the local processor bus 110. The 80486 microprocessor is described in "i486 TM as order number 240440-002, which is incorporated herein by reference. When the processor 160 requests a data from a particular address, the internal cache 180 first determines whether the data from the particular address has been cached. If not, the internal cache 180 reads a line of data (e.g., sixteen bytes) from the local memory 162 or the P-bus memory 150 and stores the new line of data in the internal cache 180. Thereafter, when data from the sixteen-byte line are needed, the data are transferred from the internal cache 180 to the processor 160. As discussed above, when the processor 160 writes to an address that has been cached, the data is stored in the internal cache 180 and is also written to the corresponding address in the local memory 162 or the P-bus memory 150. The ISA-bus memory 140 is not cached since it is accessible by other devices and the data in the ISA-bus memory 140 may be changed without reflecting the change in the corresponding data in the internal cache memory 180.

Although the internal cache memory 180 of the 80486 microprocessor provides significant advantages over no caching, it has been found to be inadequate in some aspects. For example, as discussed above, the 8,192-btye internal cache memory 180 is not sufficiently large for some applications where instructions and data are obtained over a large range of addresses. Further, in many cases a copy-back cache is desirable. The present invention includes an external cache memory system that provides 128 KBytes (131,072 bytes) of data storage. In the preferred embodiment, the external cache memory system is a copy-back cache memory system. A particularly advantageous feature of the present invention is that the cache memory system can respond without requiring any wait states while enabling the cache enable input to the internal cache 180 of the processor 160. Furthermore, the present invention is responsive to addresses directed to non-cacheable zero wait state devices to block the cache enable signal for accesses to such devices.

Figure 2:
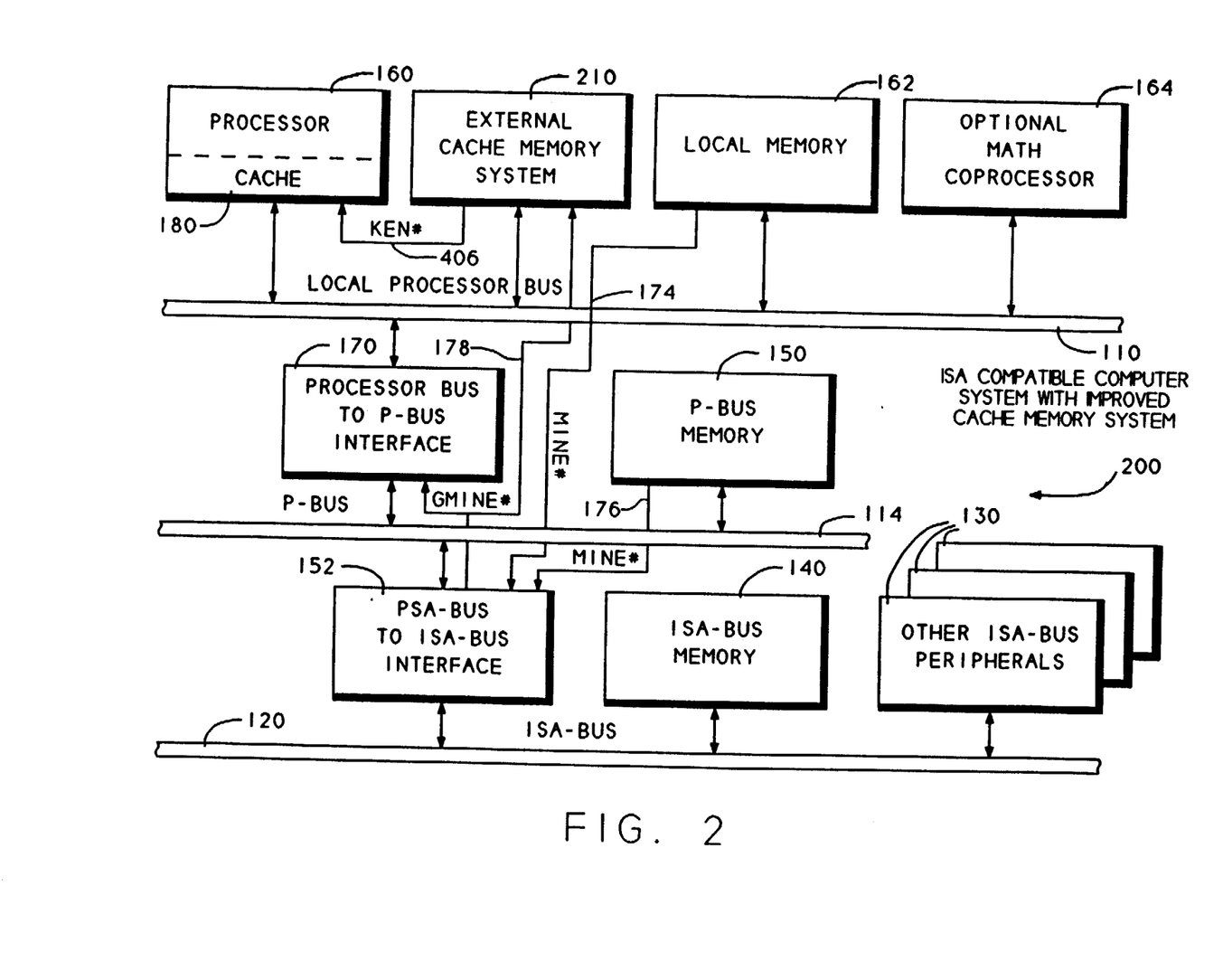
FIG. 2 is a simplified block diagram of an exemplary computer system into which the external cache memory system of the present invention is incorporated.

The present invention is shown in FIG. 2 as part of a computer system 200 which includes the elements described above for the computer system 100 and which are numbered with like numbers. The present invention includes an external cache memory system 210 (shown in more detail in FIG. 3) which includes a cache memory controller 212 and a cache memory 214. The cache memory system 210 is connected to the processor 16 via the local processor bus 110. Preferably, the cache memory 214 has a storage capacity of 128 KBytes.

Figure 3:
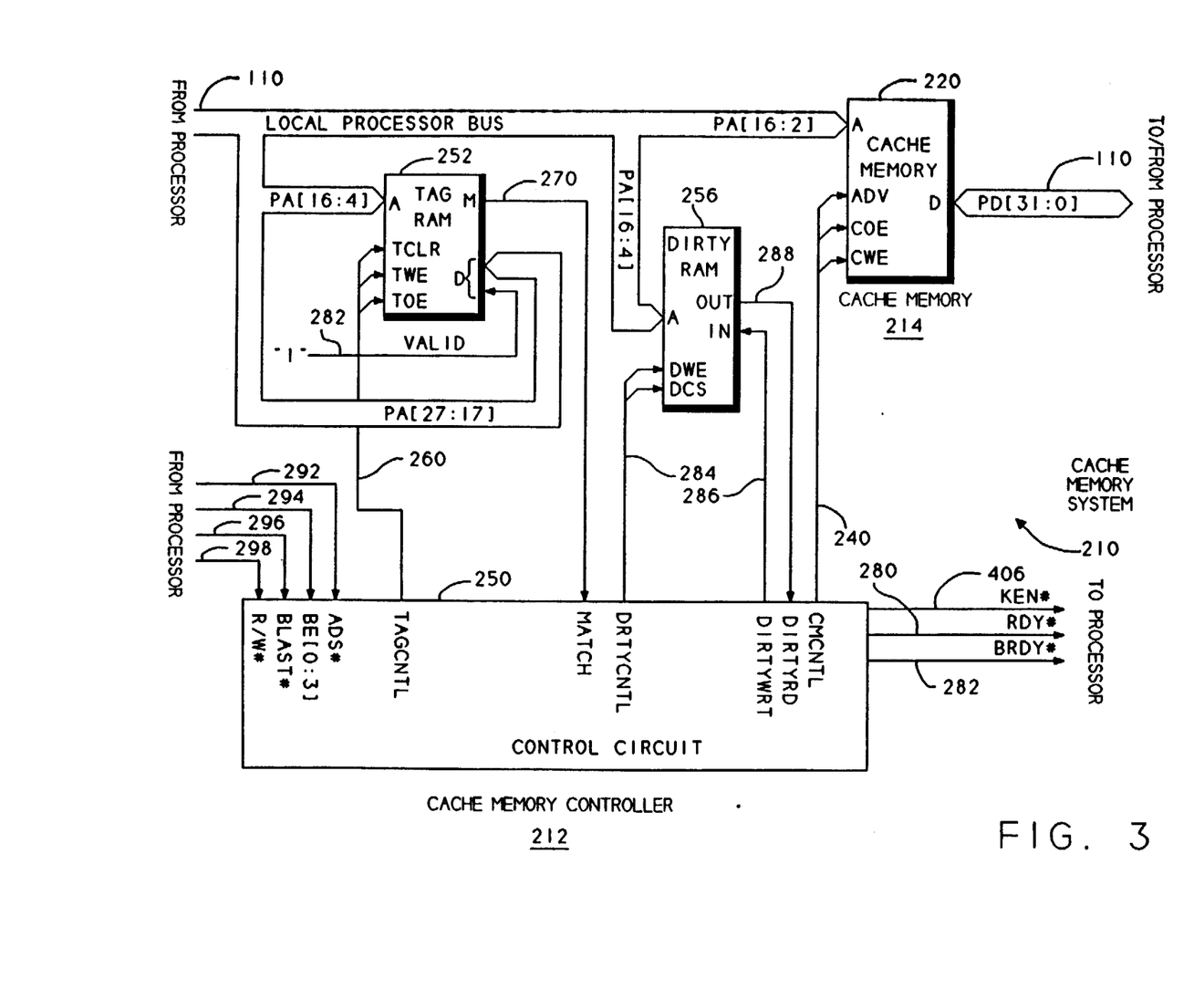
FIG. 3 is a block diagram of the external cache memory system of the present invention.

A block diagram of the cache memory system 210 is illustrated in FIG. 3. As illustrated, the cache memory 214 comprises a bank of static random access memory 220. The bank of memory 220 comprises a 128 KBytes of data storage organized as 32,768 double words by 32 bits per double word. In addition, four parity bits are provided. In the preferred embodiment, the bank of memory comprises four MCM62486 32K×9-bit synchronous static RAMs available from Motorola Inc. The data inputs and outputs are bidirectional and are connected to the data portion of the local processor bus 110. The bank of memory 220 has a 14-nanosecond access time.

The addresses for the bank of memory 220 comprise bits 16-2 (i.e., PA[16:2]) of the address portion of the local processor bus 110. (As used herein, bit 0 is the least significant bit of address and bit 31 is the most significant bit of the address bus).

The cache memory controller 212 also provides a cache write enable (CWE) signal, an cache output enable (COE) signal and a burst address advance (ADV) signal to the memory bank 220 on a set of cache memory control lines (CMCNTL) 240. When the write enable control signal is activated by the cache memory controller 212, data from the local processor bus 110 is written into the memory bank 220 at the address on the local processor bus 230. The data is provided by the data portion (PD[31:0]) of the local processor bus 110 and may be data from the processor 160, the local memory 162 or the P-bus memory 150. When an output enable control signal is activated by the cache memory controller 212, data from the memory bank 220 at the address on the local processor bus 230 is enabled onto the local processor bus 110. The burst advance signal is provided to cause the memory bank 220 to automatically output four 32-bit double words of data onto the local processor bus so that an entire line of data is provided to the internal cache memory 180 of the processor 160 or to the local memory 160 or P-bus memory 150. The burst advance signal is activated after each activation of the RDY# signal or the BRDY# signal.

The cache memory controller 212 comprises a control circuit 250 which advantageously comprises a plurality of programmable gate arrays (not shown); a tag RAM 252; and a DIRTY RAM 256.

The control circuit 250 generates a tag RAM output enable signal (TOE), a tag RAM write enable signal (TWE), a tag RAM clear signal (TCLR) which are provided a inputs to the tag RAM 252 on a set of tag control (TAGCNTL) signal lines 260. In addition, thirteen address bits (PA[16:4]) from the local processor bus 110 are provided as address inputs to the tag RAM 252. Eleven address bits (PA[27:17]) from the local processor bus 110 are provided as data inputs to the tag RAM 252. The tag RAM 252 preferably comprises three IDT6178 Cache Tag RAM circuits commercially available from Integrated Device Technology, Inc. Each circuit is a 4,092-word by 4-bit RAM that includes an internal comparator. When an address is applied to the address inputs, each circuit compares the data stored at that address with data on the data input, and, if the data matches, provides an active match output within 15 nanoseconds. The match output from the tag RAM 252 is provided as a MATCH input to the control circuit 250 on a signal line 270. When the match output of a tag RAM is active, the address applied to the data inputs to the tag RAM matches the data stored in the tag RAM.

The operation of the tag RAM 252 in controlling the cache memory is well-known to the art and will be briefly described. Basically, when data is cached in the memory bank 220, the data comprises four 32-bit data words that are stored in four consecutive addresses of the memory bank 220. The four 32-bit data words are referred to as a "line". The least significant bits of the address from the local processor bus (bits 1 and 0) are not used since they define the four bytes within a data word, and data is stored in the memory bank 220 on word boundaries. The control circuit 250 controls the sequential storing of data words in the memory bank 220 by activating the burst advance signal, as discussed above. The starting address for the line stored in the memory bank 220 is determined by the address bits PA[16:4] on the local processor bus 110. Since the addresses to the memory bank 220 repeat every 32,768 double words, only a line of data from the local memory 162 having the identical address information in bits 16-4 can be copied into the memory bank 220. The tag RAM 252 provides the information that determines the origin of the current line of data stored in the memory bank 220. When a new line of data is written into the memory bank 220, the control circuit 250 activates the cache write enable signal CWE to cause address bits PA[27:17] of the current address on the local processor bus 110 to be written into the tag RAM 252.

When a new address is applied to the processor bus 110 during a subsequent cycle, address bits PA[27:17] of the local processor bus 110 are applied to the data inputs of the tag RAM 252 and address bits PA[16:4] are applied to the address inputs of the tag RAM 252. If the applied address bits PA[27:17] match the stored address bits, then the line of data stored in the memory bank 220 are from the currently accessed address. When the control circuit 250 detects the match, it enables data from the memory bank 220 onto the data portion of the local processor bus 110. The control circuit 250 also immediately enables a BRDY# output signal on a line 280 which is connected to the processor 160. (In a non-burst mode, the control circuit 250 can activate a RDY# signal on a line 282. Only the burst mode will be discussed herein.) Since the addresses have already been applied to the address inputs of the memory bank 220, the 14-nanosecond access time of the static RAMs within the memory bank 220 will have been satisfied and the data can be immediately enabled onto the local processor bus 110. Thus, if there is a hit, the cache memory system 210 can respond sufficiently fast with the data an the active BRDY# signal so that no wait states need to be added by the processor 160.

If the stored address bits in the tag RAM 252 and the applied address bits do not match, then the line of data stored in the memory bank 220 must be replaced with a new line of data from the local memory 162 or the P-bus memory 150. The control circuit 250 does not generate the BRDY# signal until a sufficient time has passed so that data can be accessed from the local memory 162, or until a BRDY# signal has been generated by the P-bus memory 150. When the data is read from the local memory 162, it is transferred to the processor 160 and is also stored in the memory bank 220.

The tag RAM 252 is organized as 4,192 words by 12 bits. Eleven of the 12 bits in each word are used to store the tag address, as discussed above. The twelfth bit is used to store a VALID flag to indicate that corresponding tag address is valid. When the tag RAM 252 is initialized, or reinitialized, the tag clear signal is activated to clear all the data in the tag RAM 252 to zeroes. The VALID flag is tied to a constant logical "1" signal (e.g., a pullup resistor to +5 volts). Thus, when a tag address is written into a location in the tag RAM 252, a logical "1" will be written into the twelfth bit position. Later, when an address in the tag RAM 252 is accessed, the data in the twelfth bit position will be compared to the logical "1" on the data input. If the stored bit is a "1", and the remaining bits compare correctly, then a match will occur; otherwise, if the location in the tag RAM 252 has not been rewritten since last initialized, the original zero written into the twelfth bit position will not compare with the logical "1" on the input even if the remaining eleven bits do compare (e.g., all zeroes on the data inputs comparing with the initialized all zeroes).

The dirty RAM 256 is used to indicate whether a line of data stored in the memory bank 220 has had new data written into it by the processor 160 since the line of data was retrieved from the local memory 162 or the P-bus memory 150; that is, whether or not the line of data is "dirty". The same address inputs (i.e., local processor bus addresses PA[16:4]) are applied to the dirty RAM 256 as are applied to the tag RAM 252. When the processor 160 writes data into the memory bank 220, the dirty bit is set in the currently addressed location in the dirty RAM 256. Thereafter, when an address on the local processor bus 110 results in no match being found by the tag RAM 252 (e.g., address bits PA[27:17] do not correspond to the address bits stored in the tag RAM 252 at the location determined by the address bits PA[16:4]), then a new line of data must be transferred from the local memory 162 or the P-bus memory 150 to the memory bank 220. The control circuit 250 looks at the dirty bit output from the dirty RAM 256 and determines that the bit is set to indicate that the line of data stored in the memory bank 220 has been modified by the processor 160 and must be stored in the corresponding location in the local memory 162 or the P-bus memory 150 before a new line of data is retrieved from the local memory 162 or the P-bus memory 150. The control circuit 250 controls the dirty RAM 256 via a dirty ram write enable signal (DWE) and a dirty ram chip select signal (DCS) on a set of dirty ram control (DRTYCNTL) lines 284.

The control circuit 250 further includes as inputs the ADS# signal on a line 292, a set of byte enable signals BE[0:3] on a set of lines 294, a BLAST# signal (which the microprocessor 160 activates to indicate that the next BRDY# signal will be the last in a burst cycle) on a line 296, and a read/write control signal (R/W#) on a line 298.

The above-described operation of the cache memory system 210 is conventional and is well-known. The improvement in the present invention lies in the operation of the cache memory controller 212 in rapidly determining whether the address on the local processor bus 110 defines an address that is cacheable. Before proceeding with a detailed description of the present invention, it is helpful to refer to a set of bus timing diagrams in FIG. 4 for an exemplary processor read cycle in the burst mode.

Figure 4:
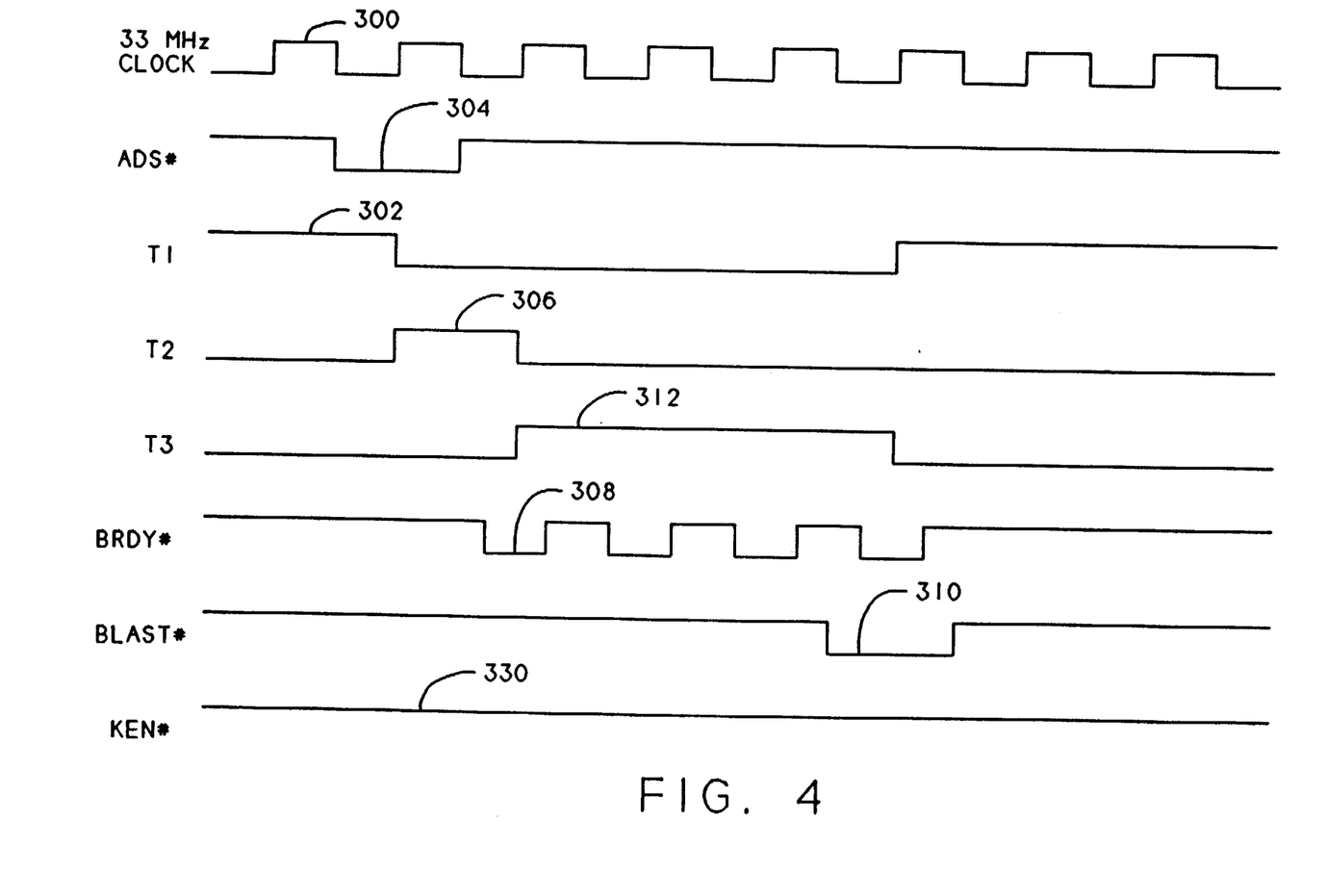
FIG. 4 illustrates timing diagrams of a non-cached transfer of data from a memory to the processor of FIG. 2 without requiring additional wait states.

As illustrated in FIG. 4, the processor 160 is controlled by a 33 MHz processor clock signal (shown in a timing diagram 300) having a cycle time of approximately 30 nanoseconds. During a time period designated as T1 (illustrated by an active high signal in a timing diagram 302) the processor 160 activates the ADS# signal (shown as an active low signal in a timing diagram 304) to indicate to devices on the local processor bus 110 that the address and cycle definition information on the bus 110 is valid. (The time period T1 may be as short as one 30-nanosecond clock cycle as shown in FIG. 4, or it may comprise multiple clock cycles.) The time period T1 ends at the end of the processor cycle in which the active ADS# signal occurs. The time period T1 is followed by a time period T2 (shown as an active high signal in a timing diagram 306) which comprises one processor clock cycle. If the addressed device responds by activating the BRDY# signal (shown as an active low signal in a timing diagram 308) or the RDY# signal (not shown) by the end of the T2 time period, the processor will accept data from the device at the end of the T2 time period. In the burst mode described herein, four double words of data are transferred from the cache memory system 210 or the local memory 160, for example, during each burst read cycle. When the cache memory system 210 drives the BRDY# signal active as shown, the processor 160 recognizes that additional double words will be following, and will wait for the next three active BRDY# signals, as shown. Upon receipt of the third active BRDY# signal, the processor 160 activates the BLAST# signal to indicate that the following double word (i.e., the fourth double word) will be the last double word accepted during this transfer. The processor 160 can activate the BLAST# signal prior to the first active BRDY# signal to terminate the burst read cycle after the first double word transfer or active the BLAST# signal prior to the second active BRDY# signal to terminate the burst read cycle after the second double word transfer. The T2 time period is followed by a T3 time period which continues until the fourth active BRDY# signal. (It should be noted that Intel, the manufacturer of the 80486 microprocessor, refers to the additional time period as an additional T2 time period; however, as used herein, only the first time period following the T1 time period is referred to a T2 time period.) The T3 time period is followed by the T1 time period which lasts until the microprocessor again activates the ADS# signal.

The timing diagrams in FIG. 4 illustrate zero-wait state cycles which means that the processor 160 is operating without pausing. That is, the external cache memory system 210 or the local memory 162 is able to provide data to the processor 160 by the end of the T2 time period and then every cycle (i.e., every 30 nanoseconds) thereafter until the end of the burst cycle..

Figure 5:
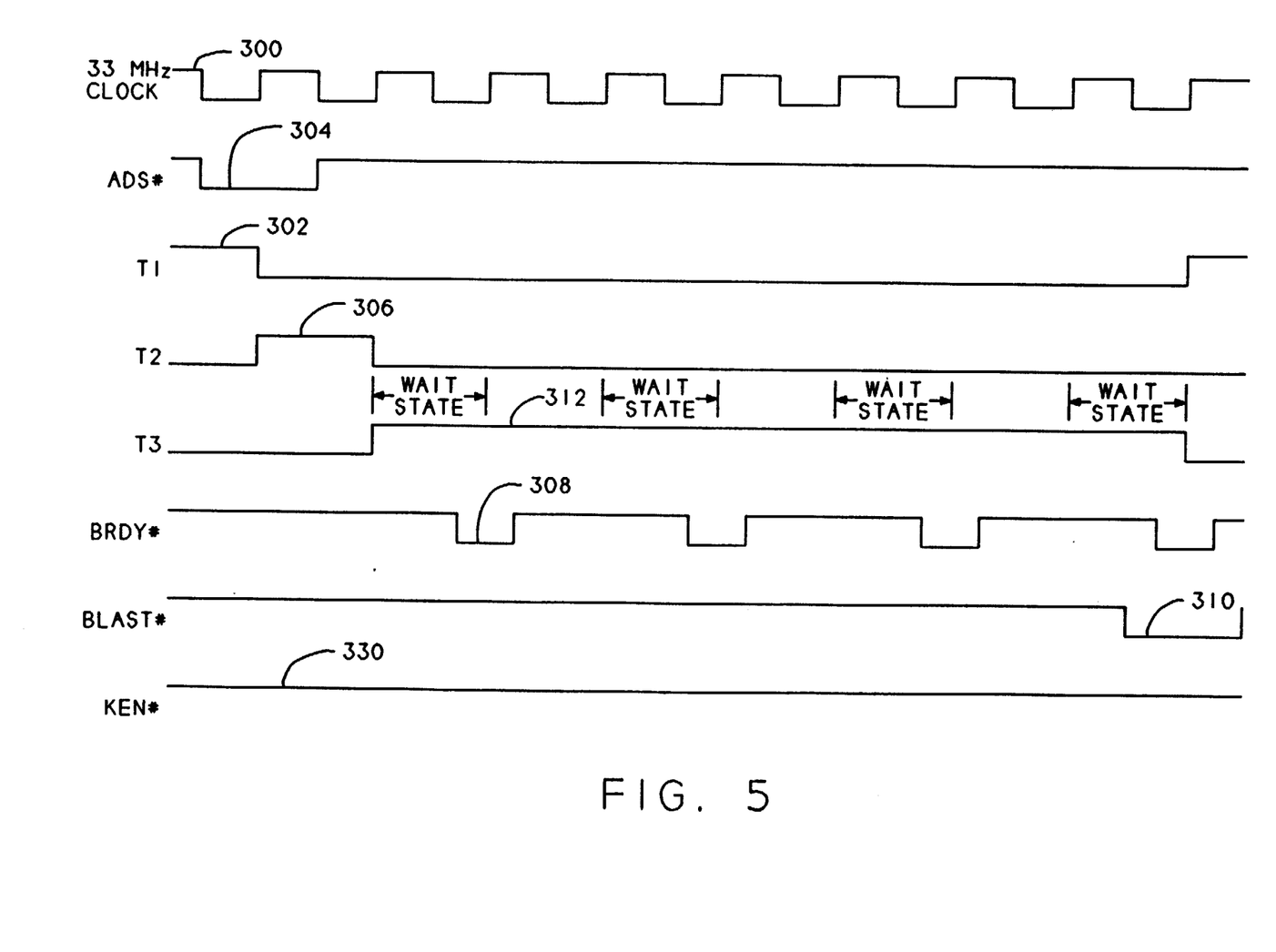
FIG. 5 illustrates timing diagrams of a non-cached transfer of data from a memory to the processor of FIG. 2 in which an additional wait state is required.

Referring now to FIG. 5, the timing diagrams for a device that requires one-wait state in which to respond are illustrated. The timing diagrams are numbered as before. As illustrated, the device does not generate an active BRDY# signal by the end of the T2 time period as before and thus the processor 160 does not input the data. The time period T3 begins at the end of the time period T2, as before, however, the BRDY# signal is not generated until the end of the first processor clock cycle in the T3 time period. The extra clock cycle required to generate the active BRDY# signal is referred to as a wait state. Slower devices may further delay the generation of the BRDY# signal by additional clock cycles. Again, assuming a burst mode transfer, the external device (e.g., the P-bus memory 150) provides three additional BRDY# signals for each of the next double words of data. When the last BRDY# is generated, the next T1 time period begins.

As discussed above, the KEN# signal is the cache enable signal that indicates to the processor 160 that the data being read from the external cache memory system 210, the local memory 162 or the P-bus memory 150 should be cached in the internal cache memory 180 for future use. Referring to FIGS. 4 and 5, it can be seen that the KEN# signal (diagram 330) is inactive at all times to indicate to the processor 160 that the data to be communicated to the processor 160 is not cacheable. If an external device (e.g., the external cache memory system 210) wants the data transferred to the processor 160 to be cached in the internal cache memory 180, the external device must activate the KEN# signal at least 5 nanoseconds before the end of the processor clock cycle in which the ADS# signal is activated by the processor 160. This is illustrated in FIGS. 6 and 7, which correspond to FIGS. 4 and 5, respectively, for cacheable data.

The ADS# signal generated by the processor 160 is not guaranteed to be active until approximately 16 nanoseconds after the beginning of the T1 time period. Thus, the state of the KEN# signal must be determined within approximately 9 nanoseconds after the ADS# signal is activated in order to meet the 5-nanosecond setup time prior to the beginning of the T2 time period. Otherwise, an additional wait state would have to be inserted by not activating the BRDY# signal before the end of the following T2 time period as was illustrated in FIG. 5. Since it is desirable to respond without inserting additional wait states whenever possible, be activated for a zero-wait state device so that the zero-wait state devices can generate the BRDY# signal before the end of the next T2 cycle.

At the present time, only two devices are generally available that can respond without inserting any wait states. The first device is the optional external math coprocessor 162 (FIG. 2), such as the Weitek 4167 coprocessor. The second device is the external cache memory system 210 described above. The data read from the coprocessor 164 should not be cached by the internal cache memory 180, and data read from the external cache memory system 210 should be cached by the internal cache memory 180. Thus, the present invention distinguishes between an access to the math coprocessor and an access to the external cache memory system 210 and deactivates the KEN# signal if the math coprocessor 164 is selected. If the coprocessor 164 is not selected, the KEN# signal is activated before the end of the T1 cycle. Thus, if the external cache memory 210 is selected and there is a hit, as described above, the external cache memory system 210 can activate the BRDY# signal before the end of the following T2 cycle and transfer data to the processor 160 without requiring the processor 160 to insert any wait states. Since the KEN# signal has been applied, the data transferred from the external cache memory system 210 will be cached by the internal cache 180. The KEN# signal must be active one clock cycle before the first active BRDY# signal to cause the internal cache 180 to store the input data, and the KEN# signal must again be active one clock cycle prior to the fourth (i.e., last) BRDY# signal at the end of the burst cycle as shown at 332 in FIG. 6 so that internal cache memory 180 will mark the cached data as valid. As further shown in FIG. 6 by the dashed line portion of the KEN# signal, it is not necessary that the KEN# signal remain active throughout the four double word burst.

Figure 6:
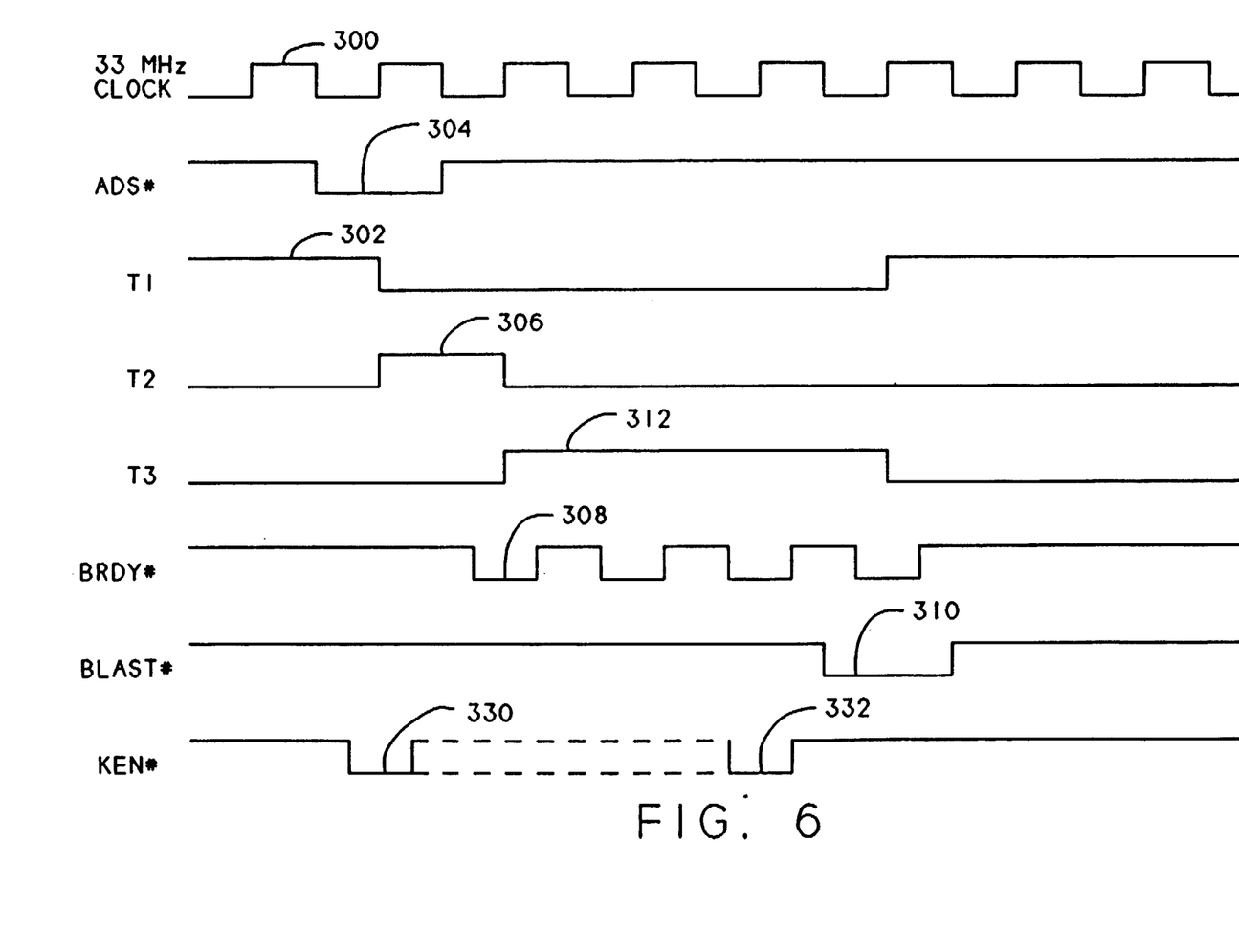
FIG. 6 illustrates timing diagrams similar to the timing diagrams of FIG. 4 in which the KEN# signal is activated to cause the memory data to be cached in the internal cache memory of the processor of FIG. 2.
Figure 7:
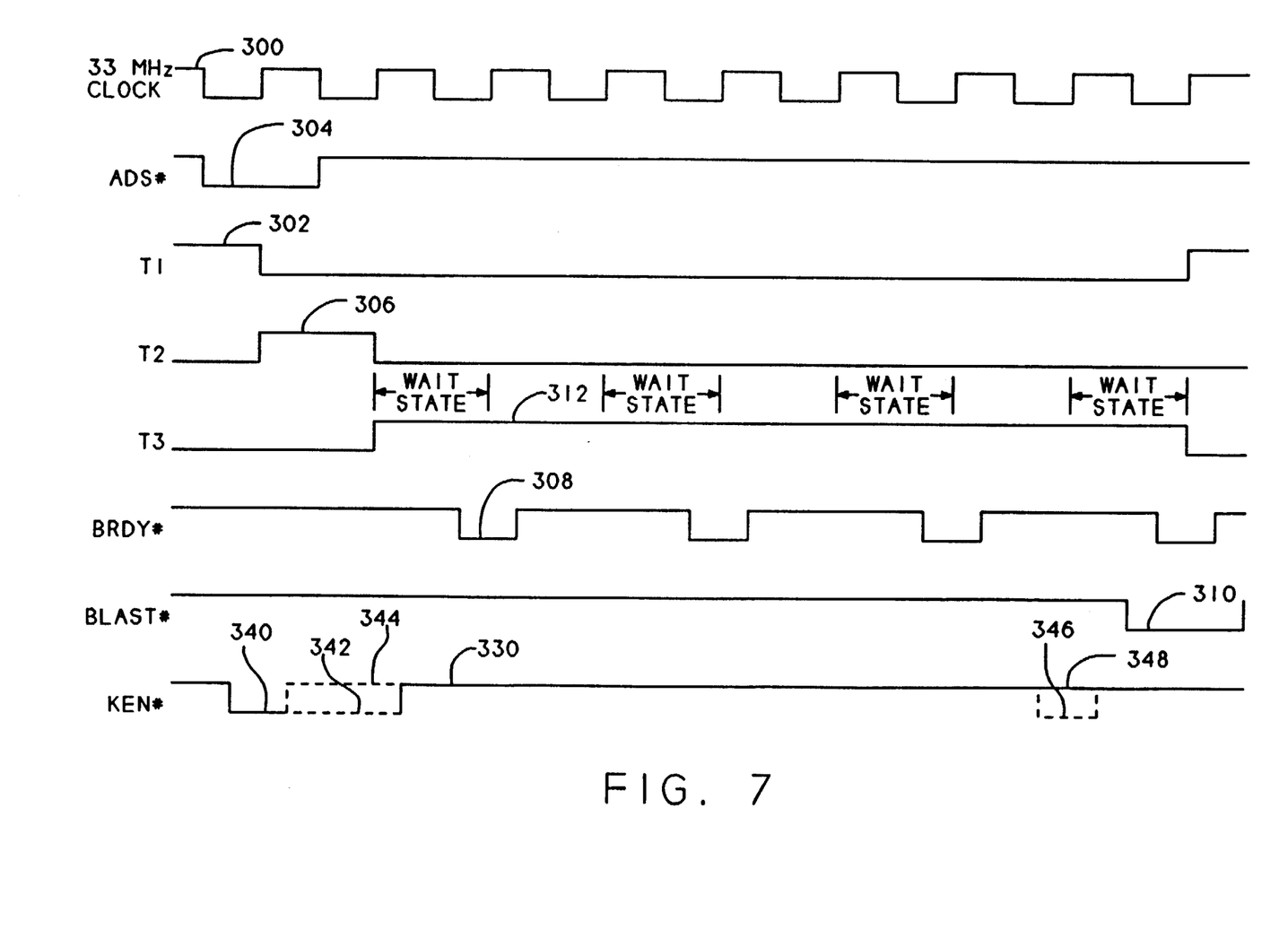
FIG. 7 illustrates timing diagrams similar to the timing diagrams of FIG. 5 in which the KEN# signal is activated to cause the memory data to be cached in the internal cache memory of the processor of FIG. 2.

If the address on the local processor bus 110 during the T1 cycle is an address that has its data cached in the external cache memory system 210, the external cache memory system 210 will respond with an active BRDY# signal before the end of the T2 time period, as illustrated in FIG. 6, and the processor 160 will continue without inserting a wait state. If the address is not a cached address such that the cache memory system 210 cannot respond immediately or if the address is not a cacheable local memory address, the cache memory system 210 does not generate an active BRDY# signal before the end of the T2 period. Thus, the processor 160 will automatically insert wait states and the T3 time period will be extended as illustrated in FIG. 7.

Continuing to refer to FIG. 7, the KEN# signal is activated before the end of the T1 time period (shown at 340) in case the address is directed to an address cached within the external cache memory system 210. However, the processor 160 does not automatically cache the incoming data in response to the active KEN# signal unless it is followed by an active BRDY# signal in the next clock cycle. Thus, if the cache memory controller 212 determines that the address is cacheable but that the data must come from the slower local memory 162, it maintains the KEN# signal in its active state (or reactivates the KEN# signal a second time) as represented by the lowermost dashed lines at 342 on the next clock cycle before the BRDY# signal is activated at the end of the first wait state in the time period T3.

On the other hand, if the cache memory controller 212 determines that the address is a non-cacheable address, such as an address to the ISA-bus memory 140, the cache memory controller does not activate the KEN# signal during the clock cycle before returning an active BRDY# signal. This is illustrated by an inactive high KEN# signal, represented by the uppermost dashed lines at 344 in FIG. 7. Thus, although the KEN# signal was initially activated as shown at 340, the processor 160 does not begin caching the data in its internal cache memory 180 since the KEN# signal is not active one clock cycle before the active BRDY# signal.

As in FIG. 6, the KEN# signal must be again active one clock cycle before the last active BRDY# signal in the cycle as represented by the lowermost dashed lines at 346 in FIG. 7 if the data is to be validated in the internal cache memory 180. Otherwise, the KEN# signal is held inactive as illustrated by the uppermost dashed lines at 348.

The determination of whether the address on the local bus 110 directed to a math coprocessor or not is determined by selecting readily distinguishable addressees for the math coprocessor. The 80486 has a 32-bit address bus as part of the local processor bus 110 and is thus capable of addressing up to 4 Gigabytes (4,294,967,296 bytes) of memory. A math coprocessor, such as the Weitek 4167 math coprocessor is addressed as if it were a memory device although the functions are much different. Since the math coprocessor resides in addressable memory, a range of addresses must be assigned to it. In the present invention, a range of addresses starting at location C0000000H (where the "H" suffix indicates a hexadecimal address) are assigned to the math coprocessor. A further assumption is made that it is not necessary to cache memory having addresses above the range 00000000H to 7FFFFFFFH.

Figure 8:
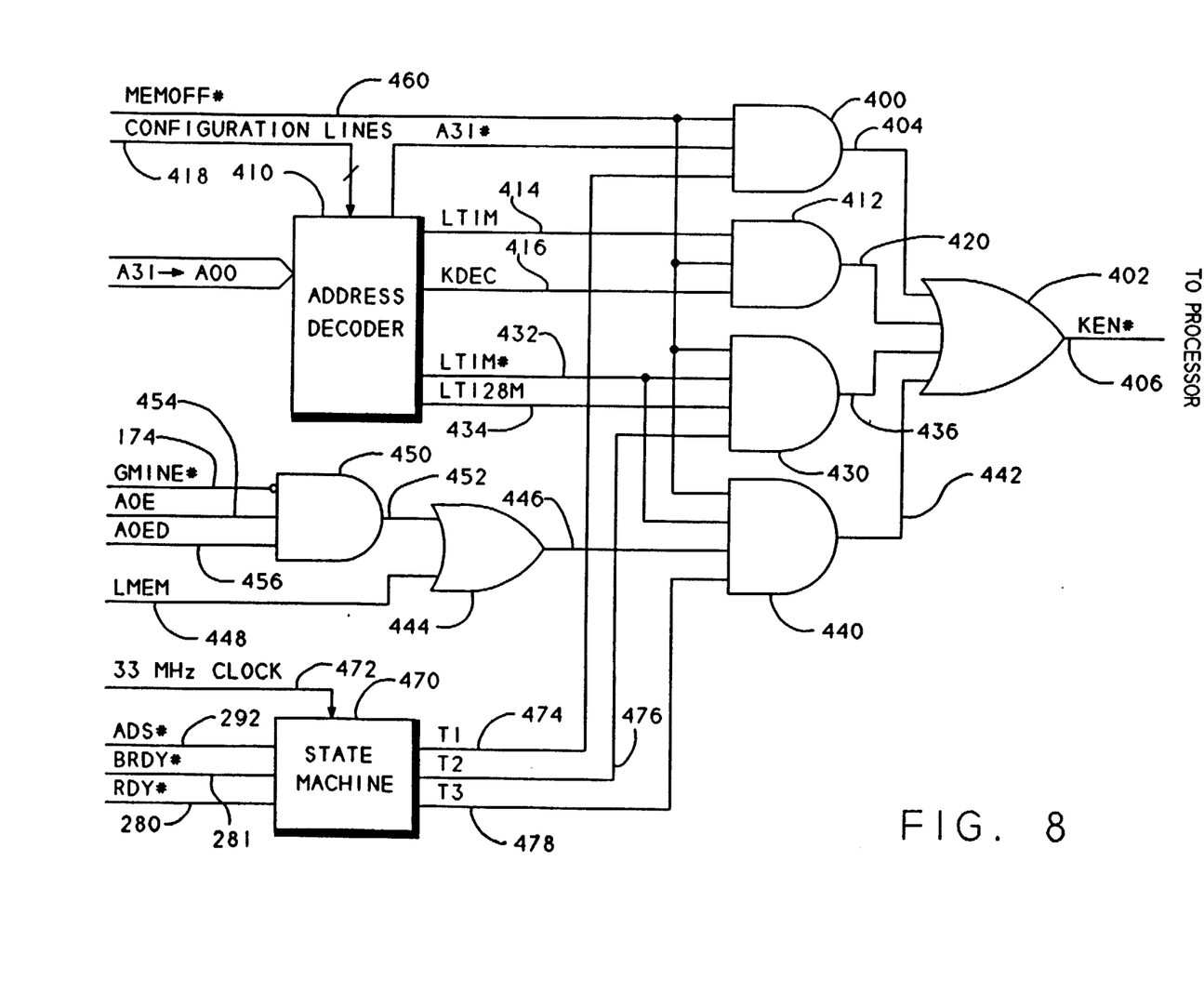
FIG. 8 is a block diagram of a portion of the cache memory control circuit of FIG. 3 showing the generation of the KEN# signal in response to the addresses generated by the processor of FIG. 2.

The KEN# signal in the present invention is preferably generated in the control circuit 250 in FIG. 3. A portion of the control circuit that generates the KEN# signal is illustrated in FIG. 8 by discrete logic. The present invention takes advantage of the fact that no address above 2 Gigabytes (i.e., above 7FFFFFFFH) will be cached by the internal cache memory 180 of the processor 160 and that no device other than the cache memory system 210 and the math coprocessor can respond without a requiring at least one wait state. Thus, during the first cycle T1, the KEN# is enabled if the most significant address bit is low, that is, if the address is in the first two Gigabytes, and is not enabled if the most significant address bit is high to indicate an address greater than the first two Gigabytes. The most significant address bit is A31. The complement of the address bit A31 is a signal A31#. The signal A31# is AND'ed in a first AND gate 400 with a T1 signal that is active during the T1 time period. The output of the first AND gate 400 is provided as one input to a NOR gate 402 via a signal line 404. The output of the NOR gate 402 is the KEN# signal on a line 406 which is connected to the input of the processor 160 (FIG. 2). The KEN# signal will be active low during the T1 time period unless the address bit A31 is active causing A31# to be low.

It can be seen that the A31 address bit only propagates through two gate levels in order to determine whether the address generated by the processor 160 is a potentially cacheable address during the T1 time period. This minimum number of gate levels enables the control circuit 250 to generate the KEN# signal within the short amount of time available after the ADS# signal and before the end of the T1 time period.

As set forth above, if the cache memory controller 212 initially determines that the addressed location is cacheable because the address is less than 2 Gigabytes, the KEN# signal is activated before the end of the T1 time period. However, if the addressed location is not in the cache memory 214, no hit will occur, and the BRDY# signal will not be activated before the end of the T2 time period. The cache memory controller 212 must then determine whether the address is a cacheable address (i.e., an address directed to the local memory 162 or another memory on the processor bus 110). If the address is cacheable, the cache memory controller 212 activates the KEN# signal so that it is active before the local memory 162 activates the BRDY# signal, as illustrated in FIG. 7. Otherwise, the cache memory controller 212 leaves the KEN# signal in its inactive state.

The foregoing describes the portion of the cache memory control circuit 250 that enables the cache memory system 210 to selectively enable or disable the KEN# signal during the first time period T1. The cache memory system 210 must also decide whether to enable or disable the KEN# signal during the T2 time period and the T3 time periods.

In the preferred embodiments of the present invention, all memory with addresses less than one megabyte are located in the local memory 162. The addresses on the local processor bus 110 are provided as inputs to an address decoder 410 which provides an output signal LTIM as an active output signal when the address decoded detects an address LTIM. The LTIM signal is provided as an input to a second AND gate 412 via a signal line 414. If an address is directed to an address less than one megabyte, the address would ordinarily be presumed to be cacheable. However, in order to be compatible with previous versions of ISA compatible computers, certain addresses within the first one megabyte are not generally useable as read/write RAM. In particular, certain addresses are reserved for the video RAM (addresses 000A0000H–000BFFFFH) and the video BIOS (addresses 000C0000H–000C7FFFH, addresses 000C8000H–000CFFFFH or addresses 000E0000–000EFFFFH, depending upon configuration settings in the computer system 200). Addresses in the range from 00080000H–0009FFFFH are cacheable if the memory accessed by the range of addresses is installed as part of the local memory and the computer system 200 is configured to access the addresses as local memory. The decoding of the various address ranges is accomplished in a conventional manner in the address decoder 410 which provides an active output signal KDEC on a signal line 416 when the addresses are not within one of the non-cacheable ranges. The address decoder 410 is responsive to a set of configuration input signals on a set of lines 418 which are advantageously provided as outputs of a configuration circuit (not shown). The second AND gate 412 further receives the A31# signal to preclude the activation of the second AND gate 412 if the external math coprocessor 164 is selected. The output of the second AND gate 412 is provided as a second input to the OR gate 402 via a signal line 420. When all the inputs to the second AND gate 412 are active, the KEN# output of the OR gate 402 is active to indicate that the address is a cacheable address.

A third AND gate 430 is provided that has a T2 signal that is active during the T2 time period signal as one input. A second input to the third AND gate 430 is a signal LTIM# which is the complement of the LT1M signal and which is also provided as an output of the address decoder 410 on a line 432. The LTIM# signal is active when the address is above 1 megabyte. A third input to the third AND gate 430 is a signal LT128 M- on a line 434 which is activated by the address decoder 410 when the address is less than 128 megabytes (less than 134,217,728 bytes). Thus, the output of the third AND gate 430 to the NOR gate 402 on a signal line 436 will be active during the T2 time period when an address is in the range between 1 megabyte and 128 megabytes. The local memory 162 is the only memory sufficiently fast to respond with a BRDY# signal before the end of the T2 time period. Thus, the active output of the third AND gate 430 causes the KEN# output of the NOR gate 402 to be active during the T2 time period since it is assured that the address is either directed to the local memory 162 or else no device will respond.

The previous AND gates are responsive to addresses directed to the local memory 162 when the local memory 162 can respond with the addition of a single wait state (i.e., by the end of the first T3 time period. Thus, the KEN# signal is generated during the T2 time period. If the addressed location is the P-bus memory 150, the P-bus memory 150 cannot respond during the first clock cycle of the T3 time period and the KEN# signal need not be activated until one clock cycle before the end of the T3 time period. A fourth AND˙gate 440 generates an active high output signal on a line 442 during the time T3 if the P-bus memory 150 is selected by the address lines. One input to the fourth AND gate 440 is the T3 signal which is active during the T3 clock time period. A second input is the output of an OR gate 444 via a signal line 446. One input to the OR gate 444 is a LMEM signal on a signal line 448 which is activated when an address is decoded that is greater that 1 Megabyte but less than the maximum address of the local memory 160 on the local processor bus 110.

A second input to the OR gate 444 is an output of a fifth AND gate 450 on a signal line 452. The fifth AND gate 450 has a first complemented input connected to receive the GMINE# signal on the signal line 174 (from FIG. 2). A second input of the fifth AND gate 450 is connected to receive an address output enable signal AOE on a signal line 454 and an address output enable delayed signal AOED on a signal line 456. The AOE signal is generated by a refresh controller (not shown) that refreshes the AT bus memory 140. During the refresh cycle, the addresses on the P-bus are generated by the refresh circuitry. An inactive AOE signal line informs the processor bus 110 to P-bus interface 170 not to drive the address lines. When the refresh cycle is over, the refresh controller activates the AOE signal to allow the processor bus to P-bus interface to again drive the address lines. However, there is a short amount of time during which the address lines are in transition between the addresses generated by the refresh controller and the addresses generated by the processor 160 via the processor bus to P-bus interface 170. Thus, the AOE signal is delayed by one clock cycle to generate the AOED signal to provide an additional 30 nanoseconds for the lines to stabilize. The AOED signal and the AOE signal are provided as inputs to the fifth AND gate 450 to prevent its output from going active until the address lines have stabilized, thus blocking any GMINE# signal that the P-bus memory 150 may generate because of the transient address lines.

If the GMINE# signal is generated after the address lines are stabilized (i.e., the AOE and AOED signals both become active), then the output of the AND gate 450 on the line 452 will be active to indicate that the addresses have selected the P-bus memory 150. Thus, the KEN# signal is generated on the output of the NOR gate 402 to cause the internal cache memory 180 to cache the data from the P-bus memory 150. The KEN# signal will remain active until the BRDY# signal from the P-bus memory 150 ends the T3 time period.

If the GMINE# signal is not active, then the addresses are directed to a device on the ISA-bus 120 (e.g., the ISA-bus memory 140), and the fourth AND gate 440 will not have an active output during the T3 time period. Therefore, the KEN# signal will not be generated because the ISA-bus data should not be cached.

One other signal is illustrated in FIG. 8. A MEMOFF# signal is applied to one input of the first, second, third and fourth AND gates 400, 412, 430 and 440 to selectively disable the KEN# signal when the local memory 162 and the P-bus memory 150 are disabled. The MEMOFF# signal is selectively generated under software control in response to a BIOS function call to temporarily disable the local memory 162 and the P-bus memory 150, for test purposes, for example.

Preferably, the circuit illustrated in FIG. 8, including the decode circuit 410, is implemented by programmable array logic (PAL) devices rather than as discrete logic. The generation of the T1, T2 and T3 time periods and corresponding signals is accomplished with a simple state machine 470 as illustrated in FIG. 8. The inputs to the state machine 470 are the RDY# and BRDY# signals on signal lines 280 and 282, respectively; the ADS# signal on a signal line 292; and the 33 MHz processor clock signal on a signal line 472. The outputs of the state machine 470 are the T1, T2 and T3 signals on signal lines 474, 476 and 478, respectively to the AND gates 400, 430 and 440, respectively. The state machine 470 is preferably implemented by the PAL circuits. Briefly, as discussed above, the T1 signal begins at the beginning of the 33 MHz clock cycle following the receipt of an active RDY# or BRDY# signal and continues until the processor 160 generates an active ADS# signal. The T2 signal begins at the end of the T1 signal and lasts for one clock cycle. The T3 signal is generated at the end of the T2 signal unless an active RDY# or BRDY# signal is received before the end of the T2 signal. The T3 signal, if activated, ends at the beginning of the 33 MHz clock cycle following the receipt of an active RDY# or BRDY# signal. It should be noted that the RDY# signal and the BRDY# signal can be activated by the external cache memory system 210 if the address is a cached address, or the signals may be generated by the local memory 162, the P-bus memory 150, or the ISA-bus memory 140.

Although described above with respect to the generation of the KEN# signal to preclude caching of coprocessor data and ISA memory data in the internal cache memory 180, it should be understood that the KEN# signal is available to the cache memory system 210 to preclude caching of that same data in the cache memory system 210. It should be further understood that the KEN# generation circuit can be used in connection with a local memory 162, for example, that can respond without wait states such that the external cache memory system 210 is not needed.

Although the preferred embodiment of the present invention has been described and illustrated above, it will be appreciated by those skilled in the art that various changes and modifications can be made to the present invention without departing from its spirit. Accordingly, the scope of the present invention is deemed to be limited only by the scope of the following appended claims.

What is claimed is:

1. A computer system comprising:

a microprocessor having an internal cache memory system, said microprocessor generating an address including a plurality of address bits, said address defining a storage location from which to store or retrieve data, said plurality of bits being sufficient to define at least first, second and third ranges of addresses, wherein said third range of addressed is included within said second range of addresses, said microprocessor outputting said address to an address bus during a first clock cycle and outputting an address valid signal to indicate that said address has been output to said address bus, said microprocessor responsive to a ready signal during a second clock cycle to input data from a data bus, aid internal cache memory system responsive to a cache enable signal to store said data in said internal cache memory system if said cache enable signal is active one clock cycle prior to said ready signal;

a first data source that provides data to said microprocessor in response to said address from said microprocessor when said address is in said first range of addresses, said first data source receiving said address valid signal from said microprocessor, said first data source responsive to said address valid signal to output data to said data bus and to output said ready signal to said microprocessor in said second clock cycle, wherein said second clock cycle is a clock cycle immediately following said first clock cycle, so that said microprocessor does not have to wait for said data from said first data source, said data output to said data bus by said first data source including cacheable data to be stored in said internal cache memory system of said microprocessor;

a second data source that provides data to said microprocessor in response to said address from said microprocessor when said address is in said second range of addresses, said second data source receiving said address valid signal from said microprocessor, said second data source responsive to said address valid signal to output data to said data bus and to output said ready signal to said microprocessor in said second clock cycle, wherein said second clock cycle is said clock cycle immediately following said first clock cycle, so that said microprocessor does not have to wait for said data from said second data source, said data output to said data bus from said second data source including noncacheable data that is not stored in said internal cache memory system of said microprocessor;

a third data source that provides data to said microprocessor in response to said address when said address is in said third range of addresses, said third data source receiving said address valid signal from said microprocessor, said third data source responsive to said address valid signal to output data to said data bus and to output said ready signal to said microprocessor in said second clock cycle, wherein said second clock cycle is a clock cycle that occurs subsequent to said clock cycle immediately following said first clock cycle, so that said microprocessor has to wait at least one clock cycle for said data from said third data source, said data output to said data bus from said third data source including non-cacheable data that is not stored in said internal cache memory system of said microprocessor; and a cache control signal generator responsive to said first, second and third ranges of addresses, said generator generating an active cache enable signal by the end of said first clock cycle when said generator receives said address from said microprocessor when said address is in said first range of addresses so that data is stored in said internal cache memory system of said microprocessor if said first clock data source generates a data ready during said clock cycle immediately following said first clock cycle, said generator deactivating said cache enable signal subsequent to the end of said first clock cycle and prior to the generation of said ready signal by said third data source when said generator receives said address from said microprocessor when said address is within said third range of addresses so that data from said third data source is not stored by said internal cache memory system of said microprocessor, said generator generating an inactive cache enable signal prior to the end of said first clock cycle when said microprocessor generates said address within said second range of addresses so that data from said second data source is not stored by said internal cache memory system of said microprocessor.

2. The computer system as defined in claim 1, wherein said first address range and said second address range are distinguishable by a single one of said address bits so that said cache control signal generator generates an active cache enable signal prior to the end of said first clock cycle when said single one of said address bits has a first state and generates an inactive cache enable signal prior to the end of said first clock cycle when said single one of said address bits has a second state.

3. The computer system as defined in claim 2, wherein said third address range within said first address range is decoded by said cache control signal generator from a plurality of address bits, and wherein said cache control signal generator requires an amount of time to decode said plurality of address bits such hat said cache control signal generator finishes decoding said plurality of address bits after the end of said first clock cycle.

* * * * *

UNITED STATES PATENT AND TRADEMARK OFFICE
CERTIFICATE OF CORRECTION

PATENT NO. : 5,247,642
DATED : September 21, 1993
INVENTOR(S) : Kenneth A. Kadlec, Shmuel Shottan It is certified that error appears in the above-indentified patent and that said Letters Patent is hereby corrected as shown below:

In column 16, line 19, change "addressed" to --addresses --.
In column 16, line 27, change "aid" to --said --.
In column 17, line 20, after "said first" delete "clock".
In column 18, line 25, change "hat" to --that --.

Signed and Sealed this

Sixteenth Day of August, 1994

Attest:

BRUCE LEHMAN

Attesting Officer      Commissioner of Patents and Trademarks